United States Patent
Small (10) Patent No.: US 9,189,880 B2
(45) Date of Patent: Nov. 17, 2015

(54) RENDERING AND DISPLAYING A THREE-DIMENSIONAL OBJECT REPRESENTATION

(75) Inventor: Jeffrey Small, Rochester, NY (US)

(73) Assignee: Synaptics Incorporated, San Jose, CA (US)

(*) Notice: Subject to any disclaimer, the term of this patent is extended or adjusted under 35 U.S.C. 154(b) by 894 days.

(21) Appl. No.: 13/194,080

(22) Filed: Jul. 29, 2011

(65) Prior Publication Data

US 2013/0027386 A1   Jan. 31, 2013

(51) Int. Cl.
| | |
|---|---|
| *G06T 15/00* | (2011.01) |
| *G06F 3/0488* | (2013.01) |
| *G06F 3/041* | (2006.01) |
| *G06F 3/044* | (2006.01) |
| *G06F 3/045* | (2006.01) |
| *G06F 3/0481* | (2013.01) |
| *H04N 13/04* | (2006.01) |

(52) U.S. Cl.
CPC .............. *G06T 15/005* (2013.01); *G06F 3/041* (2013.01); *G06F 3/044* (2013.01); *G06F 3/045* (2013.01); *G06F 3/0488* (2013.01); *G06F 3/04815* (2013.01); *H04N 13/0497* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 6,215,496 B1 | 4/2001 | Szeliski et al. | |
| 6,920,619 B1 * | 7/2005 | Milekic | 715/859 |
| 7,666,096 B2 | 2/2010 | Novelo | |
| 7,774,075 B2 | 8/2010 | Lin | |
| 7,786,992 B2 | 8/2010 | Liang et al. | |
| 8,059,104 B2 * | 11/2011 | Shahoian et al. | 345/173 |
| 2005/0264527 A1 * | 12/2005 | Lin | 345/156 |
| 2005/0286125 A1 | 12/2005 | Sundstrom et al. | |
| 2006/0256128 A1 | 11/2006 | Rai et al. | |
| 2007/0063982 A1 | 3/2007 | Tran | |
| 2010/0208033 A1 | 8/2010 | Edge et al. | |
| 2010/0245369 A1 * | 9/2010 | Yoshino | 345/522 |
| 2010/0277429 A1 * | 11/2010 | Day et al. | 345/173 |
| 2011/0096072 A1 | 4/2011 | Kim et al. | |

OTHER PUBLICATIONS

ISA/KR, International Search Report and Written Opinion for International Application No. PCT/US2012/048168, 9 pages, Dec. 28, 2012.

* cited by examiner

*Primary Examiner* — Said Broome (57) ABSTRACT

A touch screen controller is configured for use in an electronic system. The electronic system comprises: the touch screen controller, a host processing system physically distinct from the touch screen controller, a display screen, and a proximity sensor element. The touch screen controller comprises proximity sensor control circuitry, a rendering module, and display refresh circuitry. The proximity sensor control circuitry is configured to operate the proximity sensor element to sense input objects in a sensing region of the electronic system. The rendering module is configured to render three-dimensional object representations for display on the display screen. The display refresh circuitry is configured to update the display screen with an image received from and processed by the host processing system and with the three-dimensional object representation rendered by the rendering module.

20 Claims, 8 Drawing Sheets

LANDSCAPE VIEWING OF A PORTRAIT MODE DISPLAY

FIG. 6A

PORTRAIT VIEWING OF A PORTRAIT MODE DISPLAY

```
OPERATE THE PROXIMITY SENSOR ELEMENT WITH THE TOUCH
SCREEN CONTROLLER TO SENSE AN INPUT OBJECT IN A SENSING
REGION OF THE ELECTRONIC SYSTEM
710
```

```
RENDER A DISPLAY IMAGE WITH THE HOST PROCESSING SYSTEM
720
```

```
RENDER A THREE-DIMENSIONAL OBJECT REPRESENTATION WITH
THE TOUCH SCREEN CONTROLLER
730
```

```
UTILIZE THE TOUCH SCREEN CONTROLLER TO UPDATE THE DISPLAY
SCREEN WITH THE DISPLAY IMAGE AND WITH THE THREE-
DIMENSIONAL OBJECT REPRESENTATION
740
```

RENDERING AND DISPLAYING A THREE-DIMENSIONAL OBJECT REPRESENTATION

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

When an electronic system includes both a display and a proximity sensor device, the host processing system of the electronic system may handle all processing or all processing that does not involve proximity input sensing. As the number of integrated functions performed on an electronic system increase, the processing burdens imposed on the host processing system of the electronic system also increase, resulting in host processing system induced latency in the electronic system. As a result, one or more functions of the electronic system may suffer from performance shortcomings due to the burden placed of the host processing system. For example, a delay between user input via the proximity sensor device and provision of visual feedback to the user via the display may arise because of host processing system induced latency.

SUMMARY

A touch screen controller is configured for use in an electronic system. The electronic system comprises: the touch screen controller, a host processing system physically distinct from the touch screen controller, a display screen, and a proximity sensor element. The touch screen controller comprises proximity sensor control circuitry, a rendering module, and display refresh circuitry. The proximity sensor control circuitry is configured to operate the proximity sensor element to sense input objects in a sensing region of the electronic system. The rendering module is configured to render three-dimensional object representations for display on the display screen. The display refresh circuitry is configured to update the display screen with an image received from and processed by the host processing system and with the three-dimensional object representation rendered by the rendering module.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments of the present invention and, together with the Description of Embodiments, serve to explain principles discussed below, where like designations denote like elements, and.

DESCRIPTION OF EMBODIMENTS

The following Description of Embodiments is merely provided by way of example and not of limitation. Furthermore, there is no intention to be bound by any expressed or implied theory presented in the preceding background or brief summary, or in the following detailed description.

Overview of Discussion

Herein, various embodiments are described that provide input devices and methods that facilitate improved usability. In various embodiments described herein, the input proximity sensing input device utilized with the described electronic system may be a capacitive sensing device.

Discussion begins with a description of an example electronic system with which or upon which various embodiments described herein may be implemented. Components of the electronic system are then described. Geometry of human viewing of a three-dimensional (3D) object is described. Rendering of a pair of individual eye images for a 3D object representation and rendering of a single interleaved 3D object representation are described. Proper and improper repositioning of a 3D object representation is described as is rendering a 3D object representation to appear at a desired depth or a desired orientation (landscape/portrait) on a display screen. Components of the electronic system are then further described in conjunction with description of an example method of operating an electronic system (where the electronic system comprises a host processing system, a display screen, a proximity sensor element, and a touch screen controller that is physically distinct from the host processing system).

Example Input Device

Figure 1:
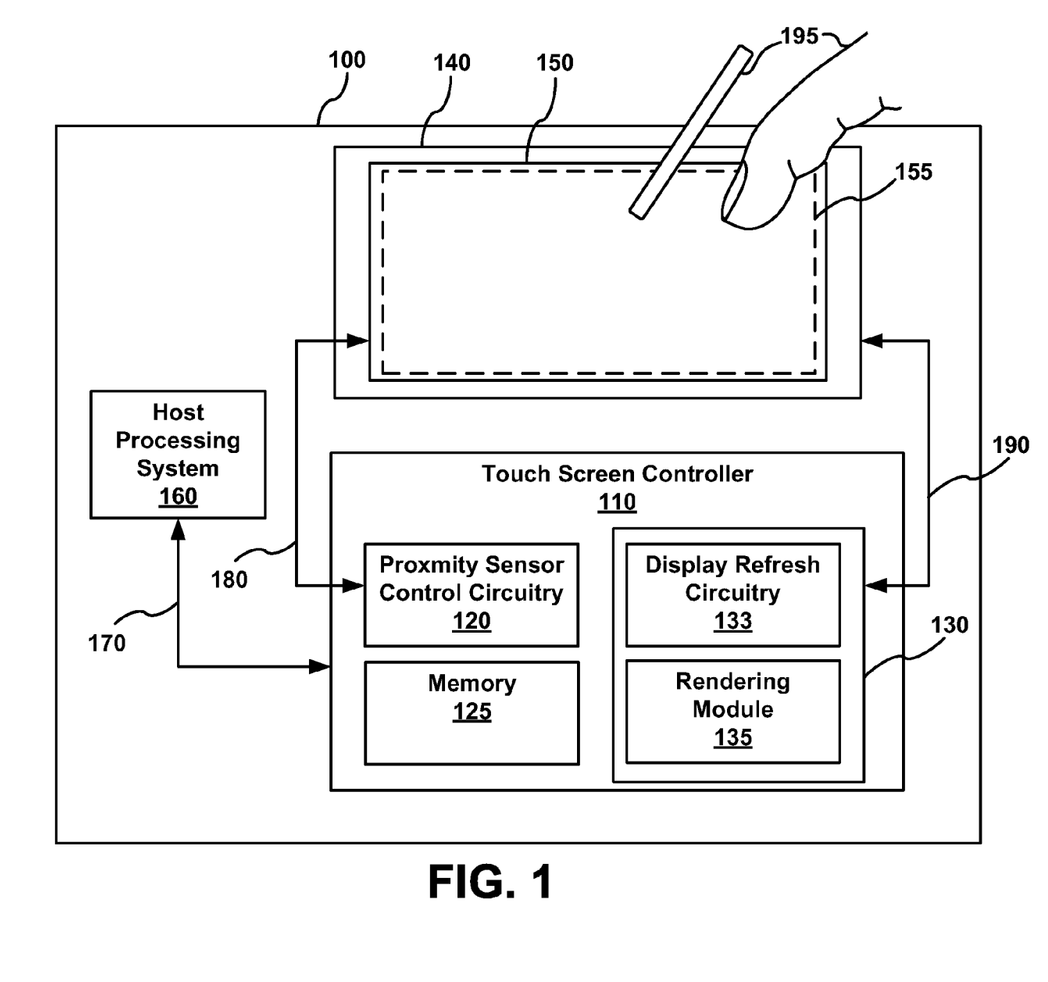
FIG. 1 illustrates an example of an electronic system, in accordance with various embodiments.

FIG. 1 depicts electronic system 100, in accordance with an embodiment of the present invention. Electronic system 100 includes touch screen controller 110 (which includes proximity sensor control circuitry 120, memory, 125 and display controller 130), display screen 140, proximity sensor element 150 and host processing system 160, all of which will be described in detail later. As will be further described, in some embodiments, display controller 130 includes one or more of display refresh circuitry 133 and rendering module 135. Connecting arrows 170, 180, and 190 indicate that, in some embodiments, host processing system 160 has bidirectional interactions with touch screen controller 110, proximity sensor control circuitry 120 has bidirectional interactions with proximity sensor element 150, and display controller 130 has bidirectional interactions with display screen 140. In other embodiments, some or all of these interactions may be unidirectional.

In various embodiments, electronic system 100 is any electronic system that comprises the aforementioned components and functions (e.g., receives user input and provides visual feedback to the user). As non-limiting examples, embodiments of electronic system 100 may comprise: personal computers (e.g., desktop computers, laptop computers, portable computers, workstations, handheld computers, personal digital assistants, and video game machines), communication devices (e.g., wireless phones, pagers, and other messaging devices), media devices that record and/or play various forms of media (e.g., televisions, cable boxes, music players, digital picture frames, video players, digital cameras, and video cameras), peripherals to larger systems (e.g., printers, keyboards, and remote controls), white goods (e.g., household appliances), automotive devices, industrial devices, electronic toys, multimedia devices (e.g., combinations of devices such as a wireless phone/handheld computer/music player), and any other electrical system or device that could benefit from having a sophisticated user interface that does not significantly burden its host processing system.

In some embodiments, elements of electronic system 100 are physically unified. For example touch screen controller 110, display screen 140, proximity sensor element 150, and host processing system 160 may all disposed within a common housing in an embodiment such as a handheld computing system.

Display screen 140 is configured for displaying images. Display screen 140 may be a cathode ray tube (CRT), a liquid crystal display (LCD), an organic light emitting diode (OLED) display, an electroluminescent display, or any other type of display screen suitable to be integrated in an electronic system. Additionally, in some embodiments, electronic system 100 includes a backlight (not shown) to enhance visibility of images on display screen 140.

Proximity sensor element 150 is shown in FIG. 1 as a rectangle overlapping display screen 140. However, in various embodiments, the actual physical sensor components of proximity sensor element 150 may be located inside or outside of the rectangle and may partially or completely overlap the active area of display screen 140. The "active area" is the region in which electronic images may be displayed by display screen 140. It will be understood that some embodiments of display screen 140 may include regions, such as border regions, in which electronic images may not be displayed.

Although sometimes referred to as "touch" sensors, embodiments of proximity sensor element 150 may respond to contact and/or non-contact user input in their respective sensing regions (e.g., sensing region 155). Sensing region 155 partly or completely overlaps with proximity sensor element 150 and with an active area of display screen 140.

Embodiments of proximity sensor element 150 may demark their sensing regions 155 using surfaces. During operation, proximity sensor element 150 is operated to detect one or more input objects 195 in the sensing region, for sensing user input. Although depicted in FIG. 1, input objects 195 are not a part of electronic system 100. "Sensing region," as used herein is intended to broadly encompass any space where proximity sensor element 150 is able to reliably detect an input object 195. In some embodiments of proximity sensor element 150, sensing region 155, extends from a surface of proximity sensor element 150 in one or more directions into space until decreased signal-to-noise prevents accurate object detection. This distance may be on the order of less than a millimeter, millimeters, centimeters, or more, and may vary significantly with the type of sensing technology used and the accuracy desired. Thus, embodiments may require contact with the surface, either with or without applied pressure, while others do not. Accordingly, in some embodiments, the planarity, size, shape and exact locations of particular sensing regions 155 vary widely from embodiment to embodiment.

Proximity sensor element 150 may utilize any combination of sensor components and sensing technologies. As several non-limiting examples, proximity sensor element 150 may use capacitive, elastive, resistive, inductive, surface acoustic wave, optical, or other techniques. Data gathered by proximity sensor element 150 may be used to determine the presence, location and/or motion of one or more input objects 195 such as fingers, styli, and/or other objects.

In some resistive implementations of proximity sensor element 150, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of proximity sensor element 150, one or more sensor elements pick up loop currents induced by a resonating coil or pair of coils. Some combination of the magnitude, phase, and frequency of the currents may be used to determine positional information.

In some capacitive implementations of proximity sensor element 150, voltage or current is applied to create an electric field. Nearby input object(s) 195 cause changes in the electric field, and produce detectable changes in capacitive coupling that may be detected as changes in voltage, current, or the like. These changes in capacitive coupling may be used to determine positional information.

Some capacitive implementations utilize arrays or other patterns of capacitive sensor electrodes to create electric fields. Some capacitive implementations utilize resistive sheets, which may be uniformly resistive.

Some capacitive implementations utilize "self capacitance" (also "absolute capacitance") sensing methods based on the capacitive coupling between sensor electrodes and free space. In one implementation, an absolute capacitance sensing method operates by modulating sensor electrodes with respect to a reference voltage (e.g., system ground), and by detecting the capacitive coupling between sensor electrodes and input object(s) 195.

Some capacitive implementations utilize "mutual capacitance" (also "transcapacitance") sensing methods based on the capacitive coupling between sensor electrodes. In one implementation, a transcapacitive sensing method operates by detecting the capacitive coupling between one or more transmitting electrodes and one or more receiving electrodes. Transmitting sensor electrodes may be substantially modulated relative to a reference voltage (e.g., system ground) to facilitate transmission, and receiving sensor electrodes may be held substantially constant relative to the reference voltage to facilitate receipt. Sensor electrodes may be dedicated transmitters and receivers, or may transmit as well as receive.

Host processing system 160 may be utilized for processing of images for display on display screen 140. For example, to display a video on display screen 140 in some embodiments, host processing system 160 provides image data for the video frames, such that display screen 140 may update with the different frames and present the video to users.

In some embodiments, host processing system 160 is configured for primary processing of the images for display on display screen 140. That is, host processing system 160 is configured to perform a majority of the processing of images for display on display screen 140. In other words, in some embodiments, electronic system 100 is designed such that a majority of image data to be display on display screen 140 would pass through and be processed by host processing system 160. The images processed by host processing system may include 2D images and/or 3D image representations which can be either streamed to display screen 140 or routed to display screen 140 via display controller 130. An image processed by and streamed from host processing system 160 is referred to herein as a "primary image." A primary image may be static or may change over a period of time. In some embodiments, the primary image is modified, or replaced entirely by host processing system 160, by touch screen controller 110, or by both.

Display controller 130 operates to render small portions of graphic content which may move or change frequently and then integrate these small portion(s) of graphic content with the displayed primary image. In computer graphics terms, such small portions of graphic content are often referred to as sprites. A two-dimensional image processed only by display controller 130 that is all or part of a 3D sprite is referred to herein as a "3D object representation overlay" or as a "3D object representation" or as an "overlay." Display controller 130 also operates to integrate a 3D object representation overlay with a primary image and then display the integrated result via display screen 140.

In some embodiments, display controller 130 utilizes rendering module 135 to render the 3D object representation overlay. Rendering module 135 renders the 3D object representation overlay as either a 2D interleaved overlay or as separate left eye and right eye image frame overlays. Typically an interleaved 2D overlay is rendered when display screen 140 is a double-frame rate display screen, while left eye and right eye frame overlays are rendered when display screen 140 is a parallax-masked display screen.

Memory 125 is utilized, in some embodiments, to store one or more pre-rendered 3D object representation overlays which may be accessed on-the-fly for integration with a primary image. Such storage of pre-rendered 3D object representation overlays reduces image processing time and improves image refresh speed by decreasing or eliminating latency that that may result from on-the-fly rendering of a 3D object representation overlay. In some, embodiments, a variety of iterations of a 3D object representation overlay of a graphic may be pre-rendered, stored in memory 125, and accessed as needed by display controller 130. Some examples of such pre-rendered iterations include 3D object representation overlays rendered for different display locations, different display orientations (portrait versus landscape), and different perceived depths.

In some embodiments, display controller 130 utilizes display refresh circuitry 133 to integrate a rendered 3D object representation overlay with a primary image and then to update display screen 140 with both the primary image received from and processed by host processing system 160 and with the 3D object representation overlay that is rendered by rendering module 135.

Display controller 130 may autonomously or semi-autonomously alter and/or move a 3D object representation overlay independently of changes to a primary image and then refresh display screen 140. Semi-autonomous operation involves following some passive or active direction or instruction provided by host processing system 160. One example of autonomous operation is rendering a 3D object representation overlay for perceived depth that is specified by touch screen controller 110. One example of semi-autonomous operation is rendering a 3D object representation overlay for perceived depth that is specified by host processing system 160. With respect to a 3D object representation overlay, such autonomous/semi-autonomous operation of display controller 130 may reduce latency, reduce response time variability, and increase responsiveness to user input compared to a situation where host processing system 160 is utilized to perform processing related to 3D object representation overlay. These improvements can increase a user's sense of ease, comfort, or confidence in the operation of electronic system 100.

In embodiments of electronic system 100, such autonomous and semi-autonomous operation reduces the processing required of host processing system 160, and thus can reduce power consumption by electronic system 100. For example, host processing system 160 may enter a low power state while the updating of 3D object representation overlay on display screen 140 is done locally by touch screen controller 110. Examples of low power states include off states, sleep states, and states where host processing system 160 expends less processing power.

In addition, in embodiments of electronic system 100, such autonomous/semi-autonomous operation of display controller 130 with respect to 3D object representation overlays reduces the maximum image data update rate that host processing system 160 needs to support while still providing smooth and responsive feedback. For example, touch screen controller 110 may be configured such that it can provide updates, with respect to 3D object representation overlay(s), to display screen 140 at a higher rate than host processing system 160 can update the primary image that is displayed on display screen 140. This also allows electronic system 100 to have relaxed requirements for communications bandwidth (e.g., serial link requirements), other performance characteristics, and the like. The relaxed requirements may provide greater design choice and cost savings.

In various embodiments, proximity sensor control circuitry 120 (optionally with other parts of touch screen controller 110) functions to operate proximity sensor element 150 to obtain measurements that enable the determination of user input characteristics such as number and motion of input object(s) 195. Such measurement(s) are utilized by touch screen controller 110, in some embodiments, to determine positional information with respect to a user input relative to sensing region 155 of proximity sensor element 150. For example, a user interaction with respect to an overlay may cause touch screen controller 110 to render and display one or more overlays on display screen 140, alter a position of an already displayed 3D object representation overlay, and/or alter a perceived depth of an already displayed 3D object representation overlay. In some embodiments, such rendering and/or display refreshing in response to user input via sensing region 155 serves to provide feedback to a user in response to the user input. For example, in an embodiment where a 3D object representation overlay represents a displayed input button, display screen 140 can be updated in response to a user input relative to the displayed input button. Such update may be to display the input button at a lower perceived depth in display screen 140 so that a user will perceive visual feedback that the input button has been depressed in response to the user input.

The term "positional information" as used herein is intended to broadly encompass absolute and relative position-type information, including motion in one or more directions and also other types of spatial-domain information such as velocity, acceleration, and the like. Various forms of positional information may also include time history components, as in the case of gesture recognition and the like. The positional information from touch screen controller 110 may be used for facilitating a full range of interface actions, including use of the proximity sensor device as a pointing device for cursor control, scrolling, and other functions.

Elements of touch screen controller 110 (e.g., proximity sensor control circuitry 120 and display controller 130) may be implemented as part or all of one or more integrated circuits (IC) and/or discrete components physically separate from host processing system 160. That is, touch screen controller 110 may comprise part or all of one IC that is separate from host processing system 160. Similarly, touch screen controller 110 may comprise parts or all of multiple ICs that are separate from host processing system 160.

In some embodiments, proximity sensor control circuitry 120 and display controller 130 do not share circuitry. That is, circuitry used to operate the touch sensor is not used to operate the display screen, and vice versa. In some embodiments, proximity sensor control circuitry 120 and display controller 130 do share circuitry, such that circuitry of proximity sensor control circuitry 120 is also circuitry of display controller 130. For example, circuitry specific to operation of proximity sensor element 150 and circuitry specific to operation of display screen 140 may be physically coupled to a same processing unit that performs computations for both touch sensor and display operation. As another example, proximity sensor control circuitry 120 and display controller 130 may hold data in the same memory.

Geometry of Human Viewing of a
Three-Dimensional Object

Figure 2:
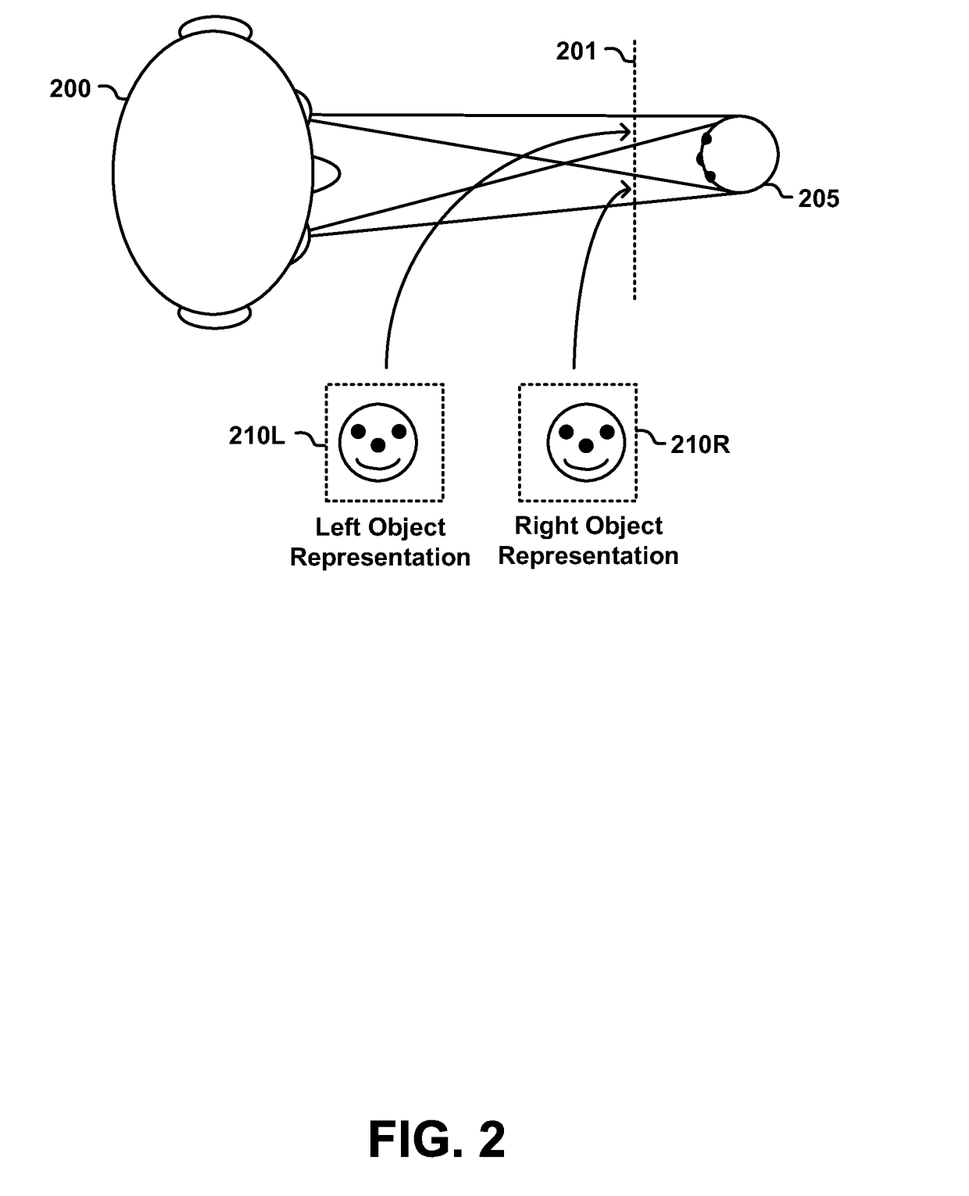
FIG. 2 illustrates the geometry of a human viewing a three-dimensional (3D) object.

FIG. 2 illustrates the geometry of a human 200 viewing a three-dimensional (3D) object 205. As depicted, the left eye of human 200 perceives a left eye object representation 210L of 3D object 205, while the right eye of human 200 perceives a right eye object representation 210R of 3D object 205. As is illustrated the left eye and right eye object representations are slightly offset from one another, thus allowing human 200 to perceive 3D object 205 as being three-dimensional. Variances in the offset equate to variances in the perceived depth of 3D object 205 with respect to plane 201. For example, a greater offset equates to a greater depth behind plane 201 while a lesser offset equates to a shallower depth behind plane 201. Similar techniques are described herein to offset a pair of 2D images or portions of a single 2D interleaved image in display screen 140, such that human 200 will perceive a 3D object being represented at a specified depth when viewing the pair of offset 2D images or the single 2D interleaved image that has offset portions.

Rendering and Displaying a 3D Object
Representation Overlay

Figure 3:
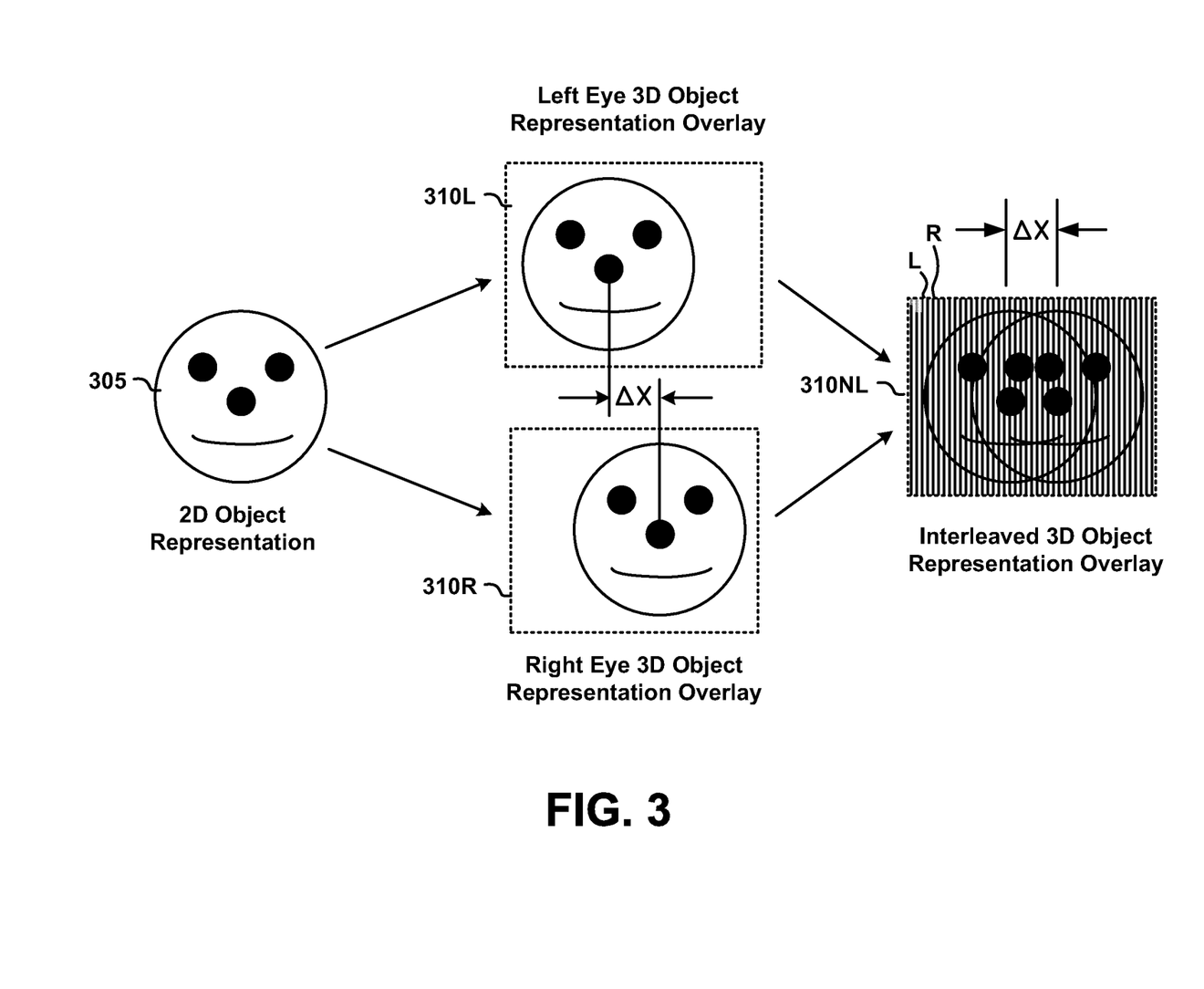
FIG. 3 illustrates a creation of separate left eye and right eye 3D object representations and of an interleaved 3D object representation, according to various embodiments.

FIG. 3 illustrates a creation of separate left eye and right eye 3D object representations and of an interleaved 3D object representation, according to various embodiments.

In one embodiment, rendering module 135 of display controller 130 renders left eye 3D object representation 310L and right eye 3D object representation 310R from 2D object representation 305. 3D object representations 310L and 310R are similar or identical to one another, but are offset by a specified distance on an X-axis relative to a viewing orientation desired by a human viewer. The X axis offset ($\Delta X$) of 3D object representations 310L and 310R may be specified such that a human viewer will perceive a desired depth associated with 3D object representations 310L and 310R when viewing display screen 140. It is appreciated that touch screen controller 110 may store pre-rendered 3D object representations 310L and 310R locally in memory 125 for future use. Pairs of 3D object representations 310L and 310R that are representative of different perceived depths out of the plane of display screen 140 may be pre-rendered and stored in memory 125 for use when a particular depth of display of the 3D object representation is specified either by host processing system 160 or by a rule stored within touch screen controller 110.

Typically, rendering module 135 renders separate left eye and right eye 3D object representations when coupled with a class of display screens such as or similar to a double-frame rate display screen 140. Such display screens typically have a very fine pixel pitch and may include larger displays such as televisions and desktop computer monitors.

In one embodiment, rendering module 135 of display controller 130 renders a single interleaved 3D object representation 310NL from 2D object representation 305. 3D object representation 310NL is a single image which essentially combines overlays 310L and 310R into a single 2D image which has the pixels of the left and right images interleaved. For example pixels of a left eye image are rendered to be located on alternating pixel columns that are labeled "L" in FIGS. 3 and 4A, while pixels of a right eye image are rendered to be located on pixel columns that are labeled "R" in FIGS. 3 and 4A. Left image pixels and right image pixels have an X axis offset ($\Delta X$) that may be specified such that a human viewer will perceive a specified depth associated with 3D object 310NL when viewing display screen 140. It is appreciated that touch screen controller 110 may store one or more pre-rendered 3D object representation 310NL locally in memory 125 for future use. A variety 3D object representations 310NL that are representative of different perceived depths out of the plane of display screen 140 may be pre-rendered and stored in memory 125 for use when a particular depth of display of the 3D object representation is specified either by host processing system 160 or by a rule stored within touch screen controller 110.

Typically, rendering module 135 renders an interleaved 3D object representation when coupled with a class of display screens such as or similar to a parallax-masked display screen 140. Such display screens typically have a coarser pixel pitch than double frame-rate displays and may include smaller displays such as those on handheld electronic systems.

If it is desired or required to move a 3D object representation 310NL vertically, then display refresh circuitry can simply displace 3D object representations 310NL vertically with respect to display screen 140. However, if it is desired to move an interleaved 3D object representation, such as 310NL, horizontally with respect to display screen 140, 310NL cannot simply be moved in single pixel steps. Instead, because of the interleaving, it must be moved horizontally by even numbers of pixels, since the left and right images will go to the wrong eyes when moved by an odd number of pixels.

Figure 4A:
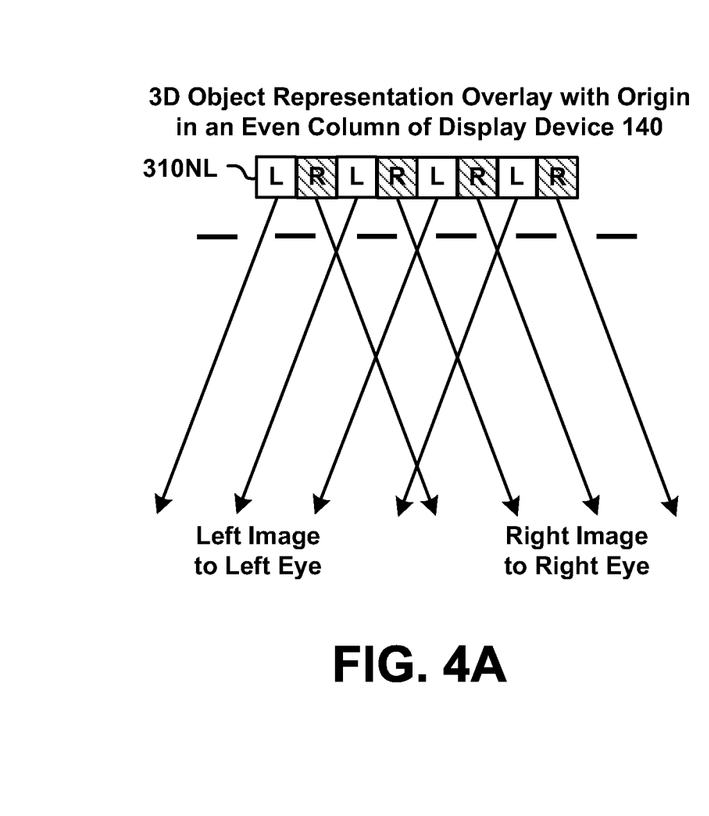
FIGS. 4A and 4B illustrate proper and improper horizontal movements of an interleaved 3D object representation, according to various embodiments.
Figure 4B:
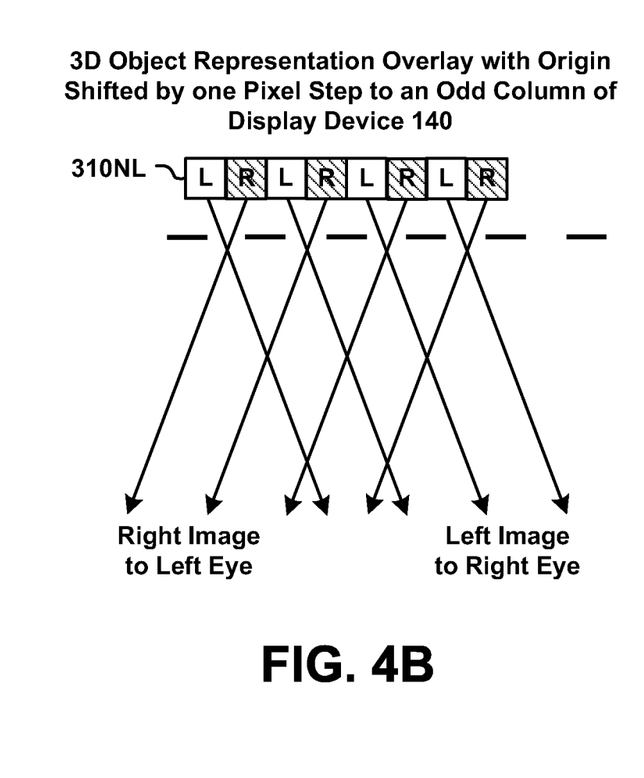

FIGS. 4A and 4B illustrate proper and improper horizontal movements of an interleaved 3D object representation, according to various embodiments. In FIG. 4A interleaved 3D object representation 310NL has an origin in an even column of display screen 140. When viewed by a user such as human 200 left eye image portions (L) are viewed by the left eye and right eye image portions (R) are viewed by the right eye. To displace interleaved 3D object representation 310NL horizontally left or right on display screen 140, interleaved 3D object representation 310NL should be moved in even numbered pixel steps (i.e., 2 pixels, 4 pixels, 6 pixels, etc.).

FIG. 4B illustrates what happens if interleaved 3D object representation 310NR is moved in odd pixel steps (i.e., 1 pixel, 3 pixels, 5 pixels, etc.). If moved in odd numbered pixel steps, when viewed by a user such as human 200, left eye image portions (L) are viewed by the right eye and right eye image portions (R) are viewed by the left eye. This causes confusion of the user.

As an alternative to displacing interleaved 3D object representation 310NR in only even numbered pixel steps, a pair of interleaved 3D Object representations 310NR may be created; one corresponding to odd-column positions and the other corresponding to even-column positions. This pair may be stored in memory 125 for future use. Then, as interleaved 3D object representation 310NR is moved horizontally on display screen 140, display refresh circuitry alternately utilizes the odd-column version and the even-column version to display as the displayed position moves across even and odd horizontal positions of display screen 140.

Figure 5:
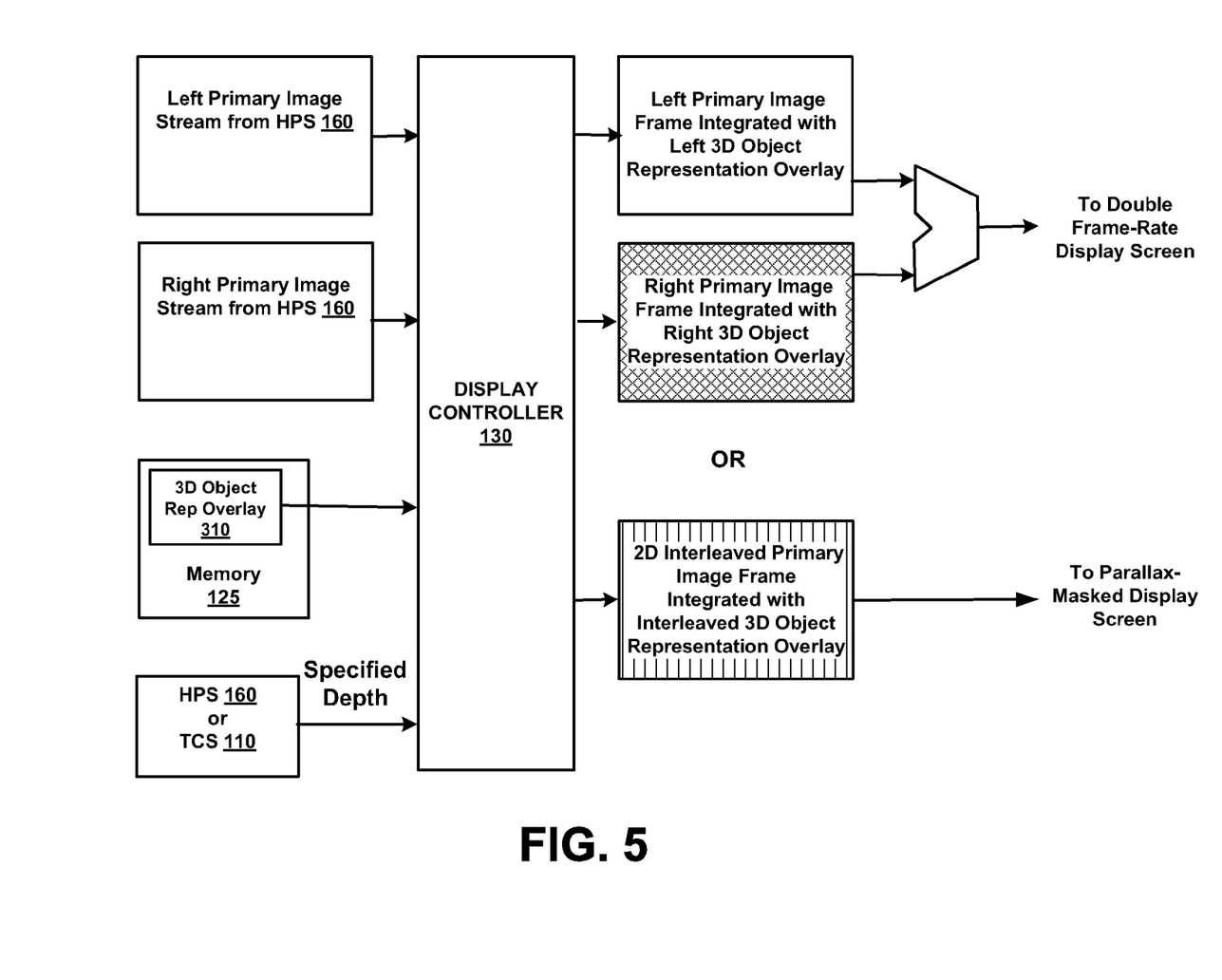
FIG. 5 illustrates rendering a 3D object representation at a specified depth, according to various embodiments.

FIG. 5 illustrates rendering a 3D object representation at a specified depth, according to various embodiments. As depicted in FIG. 5, display controller 130 receives left and right primary image streams from host processing system 160. Display controller 130 also receives a specified depth for display of a 3D image representation overlay. The specified depth may also be received from host processing system 160 or may be provided by touch system controller 110 (e.g., based on proximity sensor control circuitry sensing an input object in sensing region 155). Display controller 130 then integrates the primary image frames with a 3D image representation overlay 310 that is either rendered on-the-fly by rendering module 135 or accessed from memory 125 by display refresh circuitry 133, if pre-rendered. The nature of the integration and type of 3D image representation overlay utilized in the integration (i.e., left and right overlays or single interleaved overlay) depends on the configuration of display controller 130 and the type of display screen 140 (e.g., double frame-rate display screen or parallax-masked display screen) to which the integrated image will be provided. For example, left and right 3D image representation overlays (such as 310L and 310R) are rendered or accessed for the specified depth when display controller 130 is providing an integrated image to a double frame-rate display screen 140, and an interleaved 3D image representation overlay (such as 310NL) is rendered or accessed for the specified depth when display controller 130 is providing an integrated image to a parallax-masked display panel.

Figure 6A:
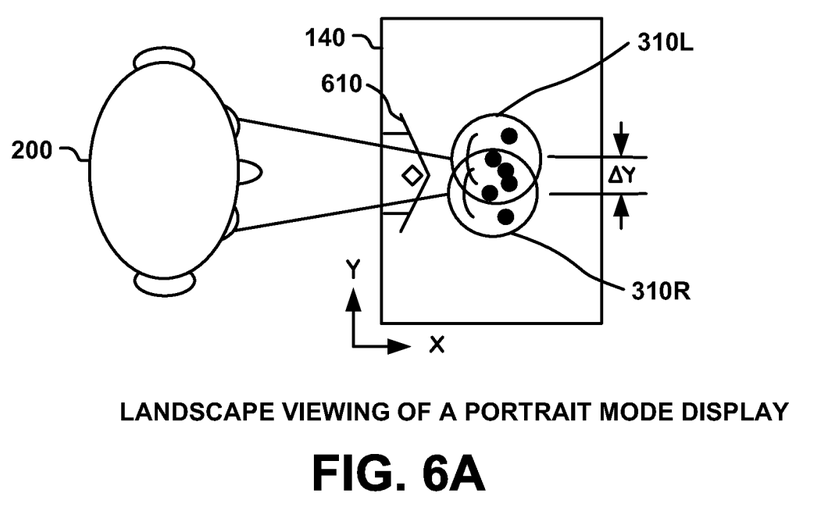
FIGS. 6A and 6B illustrate rendering a 3D object representation in portrait and landscape modes, according to various embodiments.
Figure 6B:
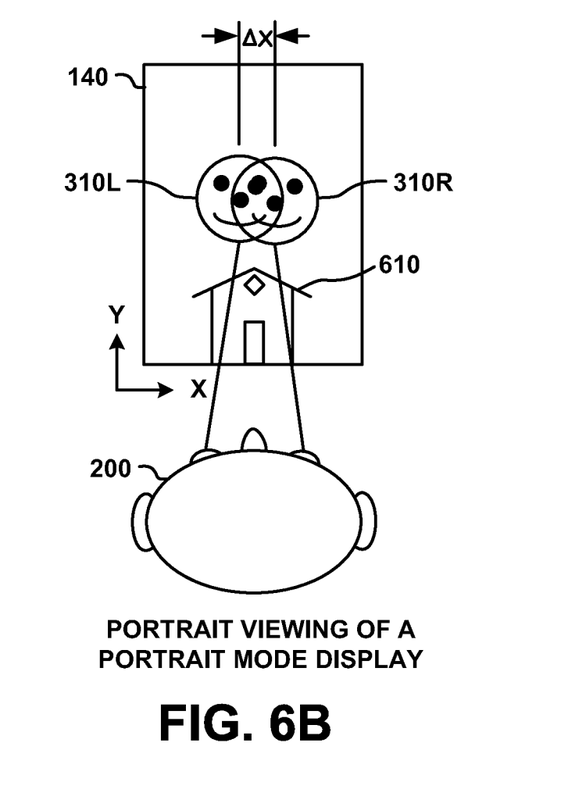

FIGS. 6A and 6B illustrate rendering a 3D object representation in portrait and landscape modes, according to various embodiments. In FIG. 6A, a primary image 610 is displayed "in plane" within a landscape view on a portrait mode display screen 140, while a 3D image representation overlay (310L and 310R) is displayed at a specified depth out of plane of display screen 140. As depicted in FIG. 6A, in some embodiments, display controller 130 can render or access a 3D image representation overlay or overlays (e.g. 310L and 310R in the illustrated example) for a desired depth and position for displaying in a landscape viewing mode on a portrait mode display. In this landscape mode, displacement between 310L and 310R in the Y-axis determines the perceived depth, and displacement between left eye portions and right eye portions of 310NL in the Y-axis determines the perceived depth. Orientation of display screen 140 may be provided to display controller 130 by host processing system 160, an accelerometer, or some other source. Rendering module 135 takes into account the landscape mode orientation of display screen 140 when rendering 3D image representation overlays for a specified depth or displacement.

In FIG. 6B, a primary image 610 is displayed "in plane" within a portrait view on a portrait mode display screen 140, while a 3D image representation overlay (310L and 310R) is displayed at a specified depth out of plane of display screen 140. As depicted in FIG. 6B, in some embodiments, display controller 130 can render or access a 3D image representation overlay or overlays (e.g. 310L and 310R in the illustrated example) for a desired depth and position for displaying in a portrait viewing mode on a portrait mode display. In this portrait mode, displacement between 310L and 310R in the X-axis determines the perceived depth, and displacement between left eye portions and right eye portions of 310NL in the X-axis determines the perceived depth. Orientation of display screen 140 may be provided to display controller 130 by host processing system 160, an accelerometer, or some other source. Rendering module 135 takes into account the portrait mode orientation of display screen 140 when rendering 3D image representation overlays for a specified depth or displacement.

Example Method of Operating an Electronic System

It should be understood that while many embodiments herein are described in the context of a fully functioning electronic system and/or touch screen controller, one or more of the mechanisms and/or processes described herein are capable of being distributed as a program product (e.g., software) in a variety of forms. For example, one or more of the mechanisms and/or processes described herein may be implemented and distributed as a software program or instructions on information bearing media that are readable by electronic processors (e.g., non-transitory computer-readable and/or recordable/writable information bearing media readable by host processing system 160 and/or touch screen controller 110 or portions thereof) and which cause the electronic processors to perform the mechanisms and/or processes. Additionally, the embodiments described herein apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 7A:
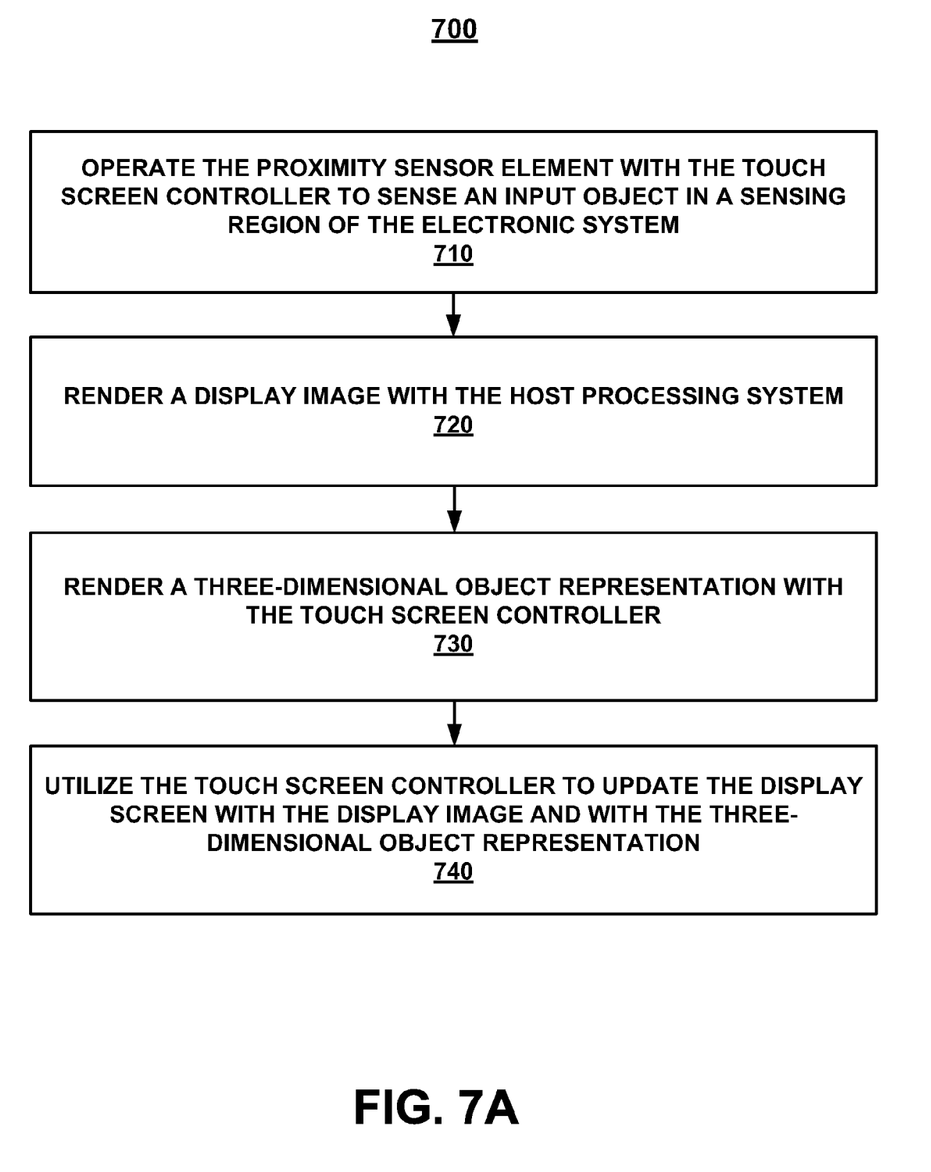
FIGS. 7A and 7B show a flow diagram of an example method of operating an electronic system comprising a host processing system, a display screen, a proximity sensor element, and a touch screen controller that is physically distinct from the host processing system, in accordance with various embodiments.
Figure 7B:
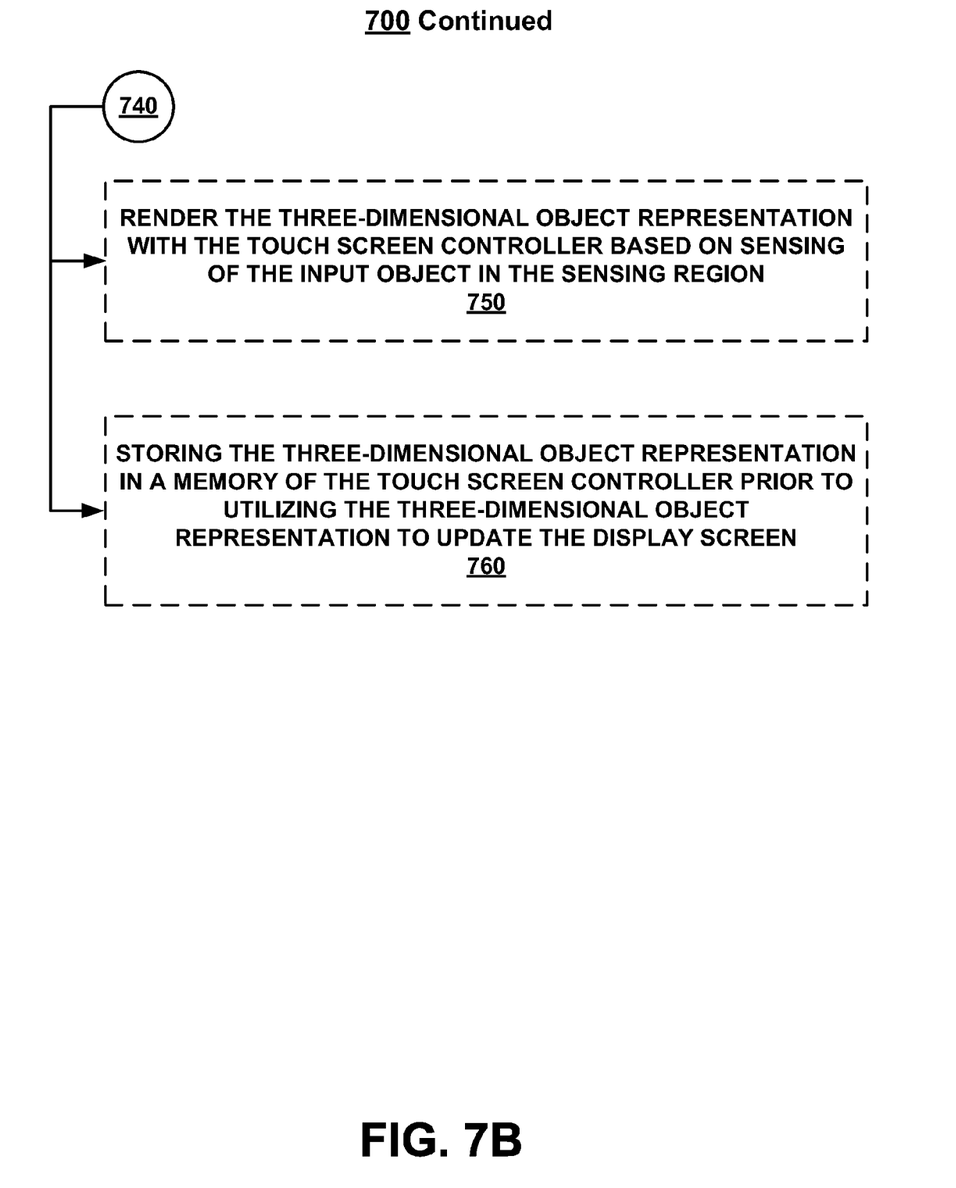

FIGS. 7A and 7B illustrate a flow diagram 700 of an example method of operating an electronic system comprising a host processing system, a display screen, a proximity sensor element, and a touch screen controller physically distinct from the host processing system, in accordance with embodiments. For purposes of illustration, during the description of flow diagram 700, reference will be made to components of processing illustrated in FIGS. 1 and 5. In some embodiments, not all of the procedures described in flow diagram 700 are implemented. In some embodiments, other procedures in addition to those described may be implemented. In some embodiments, procedures described in flow diagram 700 may be implemented in a different order than illustrated and/or described.

At 710 of flow diagram 700, in one embodiment, a proximity sensor element is operated by a touch screen controller to sense an input object in a sensing region of an electronic system. In one embodiment, this comprises touch screen controller 110 operating proximity sensor control circuitry 120 to detect one or more input objects 195 in a sensing region 155 which fully or partially overlaps an active region of display screen 140.

At 720 of flow diagram 700, in one embodiment, a display image is rendered with a host processing system. In one embodiment, this comprises host processing system 160 of electronic system 100 rendering a primary image such as image 610 of FIGS. 6A and 6B. Depending on the type of display screen 140 utilized in electronic system 100, the primary image may be rendered by host processing system 160 as a single interleaved primary image or may be rendered by host processing system 160 as separate left and right image frames overlays.

At 730 of flow diagram 700, in one embodiment, a 3D object representation is rendered by the touch screen controller of electronic system 100. The 3D object representation is an overlay for the primary image, and may be rendered by rendering module 135 on-the-fly as it is needed, or may be pre-rendered by rendering module 135 and stored (such as in memory 125) until needed. When display screen 140 is a parallax-masked display screen, rendering module 135 renders the 3D object representation as a single interleaved 2D image (e.g., 310NL of FIG. 3) which includes a left eye image portion and a right eye image portion. When display screen 140 is a double frame-rate display screen (or the like), rendering module 135 renders the 3D object representation as a pair of left and right image frame overlays (e.g., 310L and 310R of FIG. 3).

As described in conjunction with FIG. 5, display controller 130 can render a perceived depth of the 3D object representation based on input object information sensed by the touch screen controller. The perceived depth may additionally or alternatively be rendered in accordance with specified depth information for a particular situation. The specified depth information may be stored in touch screen controller 110 or provided by host processing system 160. An example of a specific situation is a user input interaction in sensing region 155 with a 3D object representation of a selectable button. The representation of a selectable button may be rendered at a specified depth which provides visual feedback to the user in the form of a depressed appearance of the selectable button in response to the input interaction.

As described in conjunction with FIGS. 6A and 6B, in some embodiments, rendering the 3D object representation as either a pair of left and right image overlays (e.g., 310L and 310R) or as a single two-dimensional interleaved overlay (e.g., 310NL) comprises rendering a perceived depth of the 3D representation based on rotation of display from a portrait display mode to a landscape display mode.

At 740 of flow diagram 700, in one embodiment, the touch screen controller is configured to update the display screen with the display image and with the 3D object representation. For example, as described in conjunction with FIG. 5, display refresh circuitry 133 of display controller 130 integrates a primary image with the 3D object representation and then updates or refreshes display screen 140 with an integrated image that includes the 3D object representation overlaid on the primary image.

At 750 of flow diagram 700, in one embodiment, the method of flow diagram 700 further includes rendering the 3D object representation with the touch screen controller based on sensing of an input object in a sensing region. For example, display controller 130 may render or re-render the 3D object representation based on mere sensing of one or more input objects 195 in sensing region 155 or based on the nature/location of the interaction of the one or more input objects 195 in sensing region 155.

At 760 of flow diagram 700, in one embodiment, the method of flow diagram 700 further includes storing the 3D object representation in a memory of the touch screen controller prior to utilizing the 3D object representation to update the display screen. In some embodiments, rendering module can pre-render one or more 3D object representations and store them in memory 125 for future use by display refresh circuitry 133.

The embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A touch screen controller for an electronic system, said electronic system comprising said touch screen controller, a host processing system physically distinct from said touch screen controller, a display screen, and a proximity sensor element, said touch screen controller comprising:
    proximity sensor control circuitry implemented by said touch screen controller and configured to operate said proximity sensor element to sense input objects in a sensing region of said electronic system;
    a rendering module implemented by said touch screen controller and configured to render three-dimensional object representations for display on said display screen, wherein said representations are rendered independently from a rendering of a primary image processed by said host processing system; and
    display refresh circuitry implemented by said touch screen controller and configured to update said display screen said primary image processed by said host processing system and with said three-dimensional object representation rendered by said rendering module.

2. The touch screen controller of claim 1, further comprising a memory for storing said three-dimensional object representations.

3. The touch screen controller of claim 1, wherein said rendering module is further configured to render said three-dimensional object representation based on one of sensing of said input object in said sensing region and input object information of said input object.

4. The touch screen controller of claim 1, wherein said rendering module is further configured to render a perceived depth of said three-dimensional object representation based on three-dimensional object information received from said host processing system.

5. The touch screen controller of claim 1, wherein said display screen comprises a double frame-rate display screen and said three-dimensional object representation comprises a left eye image frame overlay and a right eye image frame overlay.

6. The touch screen controller of claim 1, wherein said display screen comprises a parallax masked display screen and said three-dimensional object representation comprises a two-dimensional interleaved overlay.

7. An electronic system comprising:
    a host processing system;
    a display screen;
    a proximity sensor element; and
    a touch screen controller physically distinct from said host processing system, the touch screen controller configured to:
    operate said proximity sensor element to sense an input object in a sensing region of said electronic system;

render a three-dimensional object representation, wherein said representation is rendered independently from a rendering of a primary image processed by said host processing system; and update said display screen with said primary image processed by said host processing system and with said three-dimensional object representation rendered by said touch screen controller.

8. The electronic system of claim 7, wherein said touch screen controller is further configured to store a three-dimensional object representation in a memory of said touch screen controller prior to utilizing said three-dimensional object representation to update said display screen.

9. The electronic system of claim 7, wherein said touch screen controller is further configured to render said three-dimensional object representation based on sensing of said input object in said sensing region.

10. The electronic system of claim 7, wherein said touch screen controller is further configured to render a perceived depth of said three-dimensional object representation based on one of input object information sensed by said touch screen controller and depth information received from said host processing system.

11. The electronic system of claim 7, wherein said display screen comprises a double frame-rate display screen and said three-dimensional object representation comprises a left eye image frame overlay and a right eye image frame overlay.

12. The electronic system of claim 7, wherein said display screen comprises a parallax masked display screen and said three-dimensional object representation comprises a two-dimensional interleaved overlay.

13. The electronic system of claim 7, wherein said touch screen overlaps an active area of said display screen.

14. A method of operating an electronic system comprising a host processing system, a display screen, a proximity sensor element, and a touch screen controller physically distinct from said host processing system:

operating said proximity sensor element with said touch screen controller to sense an input object in a sensing region of said electronic system;

rendering a display image with said host processing system;

rendering a three-dimensional object representation with said touch screen controller, wherein said representation is rendered independently from a rendering of a primary image processed by said host processing system; and utilizing said touch screen controller to update said display screen with said primary image and with said three-dimensional object representation.

15. The method as recited in claim 14 further comprising:
rendering said three-dimensional object representation with said touch screen controller based on sensing of said input object in said sensing region.

16. The method as recited in claim 14, further comprising:
storing said three-dimensional object representation in a memory of said touch screen controller prior to utilizing said three-dimensional object representation to update said display screen.

17. The method as recited in claim 14, wherein said rendering a three-dimensional object representation with said touch screen controller comprises:
rendering a perceived depth of said three-dimensional object representation based on input object information sensed by said touch screen controller.

18. The method as recited in claim 14, wherein said rendering a three-dimensional object representation with said touch screen controller comprises:
rendering said three-dimensional object representation as a left eye image frame overlay and a right eye image frame overlay.

19. The method as recited in claim 14, wherein said rendering a three-dimensional object representation with said touch screen controller comprises:
rendering said three-dimensional object representation as a two-dimensional interleaved overlay comprising a left eye image portion and a right eye image portion.

20. The method as recited in claim 19, wherein said rendering said three-dimensional object representation as a two-dimensional interleaved overlay comprises:
rendering a perceived depth of said three-dimensional representation based on rotation of display from a portrait display mode to a landscape display mode.

* * * * *